(12) United States Patent
Shimazaki et al.

(10) Patent No.: US 6,502,884 B2
(45) Date of Patent: Jan. 7, 2003

(54) CD CHANGER MOUNTING STRUCTURE AND SUPPORT DEVICE

(75) Inventors: Takayuki Shimazaki, Niiza (JP); Hidehiko Kusakari, Niiza (JP); Tsuneaki Sakamoto, Niiza (JP)

(73) Assignee: Honda Access Corp., Saitama (JP)

( * ) Notice: Subject to any disclaimer, the term of this patent is extended or adjusted under 35 U.S.C. 154(b) by 0 days.

(21) Appl. No.: 09/946,510

(22) Filed: Sep. 6, 2001

(65) Prior Publication Data

US 2002/0041105 A1 Apr. 11, 2002

(30) Foreign Application Priority Data

Sep. 12, 2000 (JP) .................................. 2000-281758
Sep. 12, 2000 (JP) .................................. 2000-281759
Sep. 12, 2000 (JP) .................................. 2000-281760
Sep. 12, 2000 (JP) .................................. 2000-281761

(51) Int. Cl.$^7$ .............................................. B60R 11/02
(52) U.S. Cl. ......................................................... 296/37.1
(58) Field of Search ........................................ 296/37.1

(56) References Cited

U.S. PATENT DOCUMENTS 5,107,952 A * 4/1992 Matsubayashi et al. .... 296/37.1
5,532,993 A * 7/1996 Yanagisawa et al. ...... 369/75.1
5,583,834 A * 12/1996 Kanada et al. ................. 369/13

* cited by examiner

Primary Examiner—Dennis H. Pedder
(74) Attorney, Agent, or Firm—Arent Fox Kintner Plotkin & Kahn, PLLC

(57) ABSTRACT

A CD changer support device mountable in a trunk forming a luggage compartment of a motorcycle, includes a storage recess to store a CD changer. The storage recess is provided in a luggage compartment-forming wall of the trunk. A swing support device allows the CD changer to swing between a protruding position where the opening of the CD changer protrudes inside the luggage compartment and a storage position where the CD changer is stored within the storage recess. A cover plate covers the CD changer. When the CD changer is in the storage position, the cover plate blocks the opening of the storage recess so as to be flush with the inner surface of the luggage compartment-forming wall. When an operating force is applied to the swing support device, the CD changer swings between the protruding position and the storage position.

16 Claims, 12 Drawing Sheets

CD CHANGER MOUNTING STRUCTURE AND SUPPORT DEVICE

BACKGROUND OF THE INVENTION

1. Field of the Invention

The present invention relates to an improvement in a structure for mounting a CD changer on a motorcycle or a passenger vehicle and an improvement in a CD changer support device.

2. Description of the Related Art

Conventionally, there are few examples of CD changers mounted on motorcycles, but with the increase in the size of motorcycles, there is now a desire to mount a CD changer thereon.

Some larger motorcycles have a trunk above their rear wheel, and it is therefore possible to house a CD changer within the trunk in such motorcycles. However, if a CD changer is housed within the trunk, the effective capacity of the trunk is correspondingly decreased. In order to secure an effective capacity, it is necessary to increase the overall size of the trunk, but there is a possibility that enlarging the trunk may adversely influence the balance of the motorcycle. Moreover, since the vibration of motorcycles during travel is greater than that of passenger vehicles, to prevent the occurrence of sound skipping, it is necessary to be careful as to where the CD changer is positioned.

With regard to conventional passenger vehicles in which a CD changer is mounted, a CD changer is often housed in the luggage compartment portion of the trunk of the vehicle with the CD changer fixed to the floor of the luggage compartment. However, fixing the CD changer to the floor of the luggage compartment reduces the capacity of the luggage compartment by the amount occupied by the CD changer. Moreover, since it is necessary to secure a space in front of the CD changer for inserting and removing a compact disc (CD), the capacity of the luggage compartment usable to effectively load luggage is further decreased.

Furthermore, a cushion mechanism is built into the CD changer so as to prevent the occurrence of sound skipping due to vibrations caused by the vehicle traveling. However, the conventional structure in which the CD changer is supported in a fixed manner on the floor in the trunk or on an inner panel cannot prevent the occurrence of sound skipping. There has therefore been a desire for a support structure that can more reliably prevent sound skipping from occurring.

SUMMARY OF THE INVENTION

It is an object of the present invention to provide a CD changer mounting structure that minimizes the vibrations acting on the CD changer and avoids adversely influencing the balance of a motorcycle.

In order to achieve this object, in accordance with a first aspect of the present invention, a motorcycle is provided with a trunk that is disposed above a rear fender covering the upper part of a rear wheel. The trunk has a trunk main part with a horizontal base and a protrusion disposed between a rear downward curve of the rear fender and the trunk main part so as to protrude downward from a lower front part of the trunk main part. The CD changer is placed in a central area relative to a width of the motorcycle and stored within the protrusion.

In accordance with the above-mentioned arrangement, because the CD changer is placed in the central area relative to the width of the motorcycle, vibrations acting on the CD changer from the vehicle is minimized. Moreover, since the protrusion in which the CD changer is stored protrudes downward from the lower front part of the trunk main part using the rear space above the rear fender, the CD changer is effectively placed while avoiding the adverse influences on the balance of the motorcycle as well as having to change the dimensions of the trunk when compared with those in the art.

Furthermore, in accordance with a second aspect of the present invention, a storage recess, which can store the CD changer having an opening on a front surface to insert and remove a CD, is provided in the luggage compartment-forming trunk. Swing support means that allow the CD changer to be swung between a protruding position where the front surface of the CD changer protrudes inside the luggage compartment from an inner surface of the trunk, and a storage position where the CD changer is stored within the storage recess, is provided among the trunk and a pair of support plates supporting either side of the CD changer. A cover plate covers the CD changer so that when the CD changer is in the storage position, the cover plate blocks the open end of the storage recess so as to be on the same plane as the inner surface of the trunk. The cover plate is connected to the two support plates, wherein an operating force for swinging the CD changer from the protruding position to the storage position is applied to the swing support means.

In accordance with such an arrangement of the second aspect, since the CD changer can swing between the storage position where the CD changer is stored within the storage recess provided on the inner surface of the trunk, and the protruding position where the front surface of the CD changer protrudes inside the luggage compartment from the inner surface of the trunk so that a CD can be inserted and removed, the CD changer is stored within the storage recess except for when a CD is inserted and removed. Any decrease in the effective capacity of the luggage compartment due to the placement of the CD changer therein is avoided, thus securing a sufficient effective capacity. Moreover, since the cover plate blocks the open end of the storage recess when the CD changer is in the storage position so as to be on the same plane as the internal surface of the trunk, the internal appearance of the luggage compartment is not degraded. Moreover, it is possible to reliably prevent any foreign matter from coming into contact with and damaging the CD changer. Furthermore, since the cover plate connects the two support plates to each other, the rigidity with which the CD changer is supported by the two support plates is enhanced, and the operating force to swing the CD changer from the protruding position to the storage position is applied from the cover plate to the swing support means, thereby making swinging of the CD changer from the protruding position to the storage position easy.

In accordance with a third aspect of the present invention, an operating part that operates the swing support means so as to swing the CD changer from the storage position to the protruding position is placed to face a window provided in the cover plate. In accordance with the above-mentioned arrangement, when the CD changer is swung from the protruding position to the storage position, the cover plate is operated directly. When swinging the CD changer from the storage position to the protruding position, the operating part facing the window of the cover plate is operated, and the operation of swinging the CD changer thus becomes easy.

In accordance with a fourth aspect of the present invention, the swing support means includes a pair of base plates fixed to the trunk so that each base plate corresponds to one of the two support plates. Support shafts connect the two support plates to rear parts of the base plates so that the CD changer can be swung between the storage position and the protruding position. Swing biasing springs are provided between each of the two support plates and the corresponding base plates so as to spring-bias the CD changer toward the protruding position. A pair of levers are supported so as to swing around the support shafts and operate in association with each other. Pins are provided that have axes parallel to the support shafts and are fixed to corresponding levers. A pair of lever biasing springs are provided between the two levers and the two support plates. Provided on side edges on a support shaft side of guide plates provided on the two base plates are guide recesses formed in arc shapes with their centers on the axes of the support shafts and making sliding contact with the pins; first engagement recesses formed on one end along the circumferential direction of the guide recesses so that the corresponding pins engage the first engagement recesses when the two support plates are in the storage position; and second engagement recesses formed on the other end along the circumferential direction of the guide recesses so that the corresponding pins engage the second engagement recesses when the two support plates are in the protruding position. The two lever biasing springs are provided between the two levers and the two support plates so as to exhibit spring forces in a direction in which the two pins make sliding contact with the two guide recesses.

In accordance with the arrangement of the above-mentioned fourth aspect, the pair of support plates and the CD changer can swing around the axes of the support shafts within the range in which the pins fixed to the levers are in sliding contact with the guide recesses. Engagement of the pins with the first and second engagement recesses determines the storage position and the protruding position of the support plates so changing the attitude of the CD changer between the time when a CD is inserted and removed and the time when a CD is played. Furthermore, application of an operating force to the levers can disengage the pins from the engagement recesses against the spring forces of the lever biasing springs. When the pins are disengaged from the first engagement recesses in a state in which the support plates are in the storage position, the support plates automatically swing to the protruding position due to the spring forces of the swing biasing springs. When the pins are disengaged from the second engagement recesses in a state in which the support plates are in the protruding position, pushing the support plates against the spring forces of the swing biasing springs swings the support plates to the storage position. Moreover, the lever biasing springs exhibit spring forces that make the pins come into sliding contact with the guide recesses and maintain the engagement state of the pins with the first engagement recesses or the second engagement recesses and also prevents the occurrence of rattling between the support plates and the base plates.

In accordance with a fifth aspect of the present invention, the levers are made by integrally connecting an operating force application section and a position restraining section in an approximately L-shaped form. A section connecting the operating force application section and the position restraining section is supported on the support plate in a swingable manner. The pin is fixed to the extremity of the position restraining section. In accordance with the above-mentioned arrangement, the operating force application section for applying an operating force for disengaging the pin from the first and second engagement recesses at the two ends of the guide recess is rather long, and the operating force required for moving the lever is rather small.

It is another object of the present invention to provide a CD changer mounting structure that places a CD changer in the trunk of a motorcycle while avoiding any decrease in the effective capacity of a luggage compartment within the trunk.

In order to achieve this object, in accordance with a sixth aspect of the present invention, a storage recess that can store a CD changer having an opening on a front surface for inserting and removing a CD is provided in a luggage compartment-forming wall forming a luggage compartment. Swing support means that allow the CD changer to be swung between a protruding position where the front surface of the CD changer protrudes inside the luggage compartment from an inner surface of the luggage compartment-forming wall, and a storage position where the CD changer is stored within the storage recess, is provided among the luggage compartment-forming wall and a pair of support plates supporting either side of the CD changer. A cover plate covering the CD changer so that when the CD changer is in the storage position, the cover plate blocks the open end of the storage recess so as to be flush with the inner surface of the luggage compartment-forming wall, is connected to the two support plates so that an operating force for swinging the CD changer from the protruding position to the storage position is applied to the swing support means.

In accordance with such an arrangement of the sixth aspect, since the CD changer can swing between the storage position where the CD changer is stored within the storage recess provided on the inner surface of the luggage compartment-forming wall and the protruding position where the front surface of the CD changer protrudes inside the luggage compartment from the inner surface of the luggage compartment-forming wall so that a CD can be inserted and removed, the CD changer is stored within the storage recess except for times when a CD is inserted and removed and any decrease in the effective capacity of the luggage compartment due to the placement of the CD changer is avoided, thus securing a sufficient effective capacity. Moreover, since the cover plate blocks the open end of the storage recess when the CD changer is in the storage position so as to be on the same plane as the internal surface of the luggage compartment-forming wall, the internal appearance of the luggage compartment is not degraded. Moreover, it is possible to reliably prevent any foreign matter from coming into contact with and damaging the CD changer. Furthermore, since the cover plate connects the two support plates to each other, the rigidity with which the CD changer is supported by the two support plates can be enhanced, and the operating force to swing the CD changer from the protruding position to the storage position is applied from the cover plate to the swing support means, thereby making the operation of swinging the CD changer from the protruding position to the storage position easy.

In accordance with a seventh aspect of the present invention, an operating part that operates the swing support means so as to swing the CD changer from the storage position to the protruding position is placed to face a window provided in the cover plate. In accordance with the above-mentioned arrangement, when the CD changer is swung from the protruding position to the storage position, the cover plate is operated directly. When swinging the CD changer from the storage position to the protruding position, the operating part facing the window of the cover plate is operated, and the operation of swinging the CD changer thus becomes easy.

In accordance with an eighth aspect of the present invention, the swing support means includes a pair of base plates fixed to the luggage compartment-forming wall so that each base plate corresponds to one of the two support plates. Support shafts connect the two support plates to rear parts of the base plates so the CD changer can be swung between the storage position and the protruding position. Swing biasing springs are provided between each of the two support plates and the corresponding base plates so as to spring-bias the CD changer toward the protruding position. A pair of levers are supported so as to swing around the support shafts and be operable in association with each other. Pins are provided that have axes parallel to the support shafts and are fixed to corresponding levels. A pair of lever biasing springs are provided between the two levers and the two support plates. Provided on side edges of a support shaft side of guide plates on the two base plates are guide recesses formed in arc shapes with their centers on the axes of the support shafts and making sliding contact with the pins; first engagement recesses formed on one end along the circumferential direction of the guide recesses so that that corresponding pins engage the first engagement recesses when the two support plates are in the storage position; and second engagement recesses are formed on the other end along the circumferential direction of the guide recesses when the two support plates are in the protruding position. The level biasing springs are provided between the two levers and the two support plates so as to exhibit spring forces in a direction in which the two pins make sliding contact with the two guide recesses.

In accordance with the arrangement of the above-mentioned eighth aspect, the pair of support plates and the CD changer can swing around the axes of the support shafts within the range in which the pins fixed to the lever are in sliding contact with the guide recesses. Engagement of the pins with the first and second engagement recesses determines the storage position and the protruding position of the support plates so changing the attitude of the CD changer between the time when a CD is inserted and removed and the time when a CD is played. Furthermore, application of an operating force to the levers can disengage the pins from the engagement recesses against the spring forces of the lever biasing springs. When the pins are disengaged from the first engagement recesses in a state in which the support plates are in the storage position, the support plates automatically swing to the protruding position due to the spring forces of the swing biasing springs. When the pins are disengaged from the second engagement recesses in a state in which the support plates are in the protruding position, pushing the support plates against the spring forces of the swing biasing springs swings the support plates to the storage position. Moreover, the lever biasing springs exhibit spring forces that make the pins come into sliding contact with the guide recesses and maintain the engagement state of the pins with the first engagement recesses or the second engagement recesses and also prevents the occurrence of rattling between the support plates and the base plates.

In accordance with a ninth aspect of the present invention, the levers are made by integrally connecting an operating force application section and a position restraining section in an approximately L-shaped form. A section connecting the operating force application section and the position restraining section is supported on the support plate in a swingable manner. The pin is fixed to the extremity of the position restraining section. In accordance with the above-mentioned arrangement, the operating force application section to apply an operating force that disengages the pin from the first and second engagement recesses at the two ends of the guide recess is rather long, and the operating force required for moving the lever is rather small.

It is yet another object of the present invention to provide a CD changer support device that can reliably prevent the occurrence of sound skipping.

In order to achieve this object, in accordance with a tenth aspect of the present invention, on either side of a CD changer having an opening for inserting and removing a CD on the front surface are mounted a pair of mounting plates at two mounting points spaced in the longitudinal direction of the CD changer with the inner surfaces of the mounting plates facing the two sides of the CD changer. A pair of support plates are supported on the vehicle body so as to face the outer surfaces of the two mounting plates respectively. At least two support points set outside the two mounting points on each of the two mounting plates along the longitudinal direction are supported on the two support plates via dampers individually corresponding to the support points. Between the two ends in the longitudinal direction of each of the two mounting plates and the corresponding ends of each of the two support plates, are a pair of springs for applying an upward force to the CD changer.

In accordance with the arrangement of the above-mentioned tenth aspect, the mounting plates are supported on the pair of support plates via individual dampers at two positions that have a larger span than that of the two mounting points for mounting the two sides of the CD changer on the mounting plates. The CD changer is biased upward by the pairs of springs provided between each of the two ends of the two mounting plates and the two support plates. The CD changer floats on the two support plates with good balance, the vibration transmitted from the vehicle body side to the CD changer via the two support plates is absorbed by each of the dampers and each of the springs and the occurrence of sound skipping is prevented.

In accordance with an eleventh aspect of the present invention, between the two mounting plates and the two support plates are set in a detachable manner a pair of stoppers for allowing a particular relative three dimensional position of the two mounting plates and the two support plates to be maintained. In accordance with the above-mentioned arrangement, setting the two stoppers in this way makes positioning easy when connecting the two mounting plates and each of the dampers, and the CD changer can be fixed and held in position when carrying it.

Furthermore, in accordance with a twelfth aspect of the present invention, the two stoppers are linked to each other by a linking part. In accordance with the above-mentioned arrangement, the CD changer, the two mounting plates, the two support plates, the dampers, and the springs provided between the two mounting plates and the two support plates are formed into a unit. Mounting the CD changer in a vehicle is easy.

The above-mentioned objects, other objects, characteristics and advantages of the present invention will become apparent from explanation of a preferred embodiment that will be described in detail below by reference to the attached drawings.

DESCRIPTION OF PREFERRED EMBODIMENT

Figure 1:
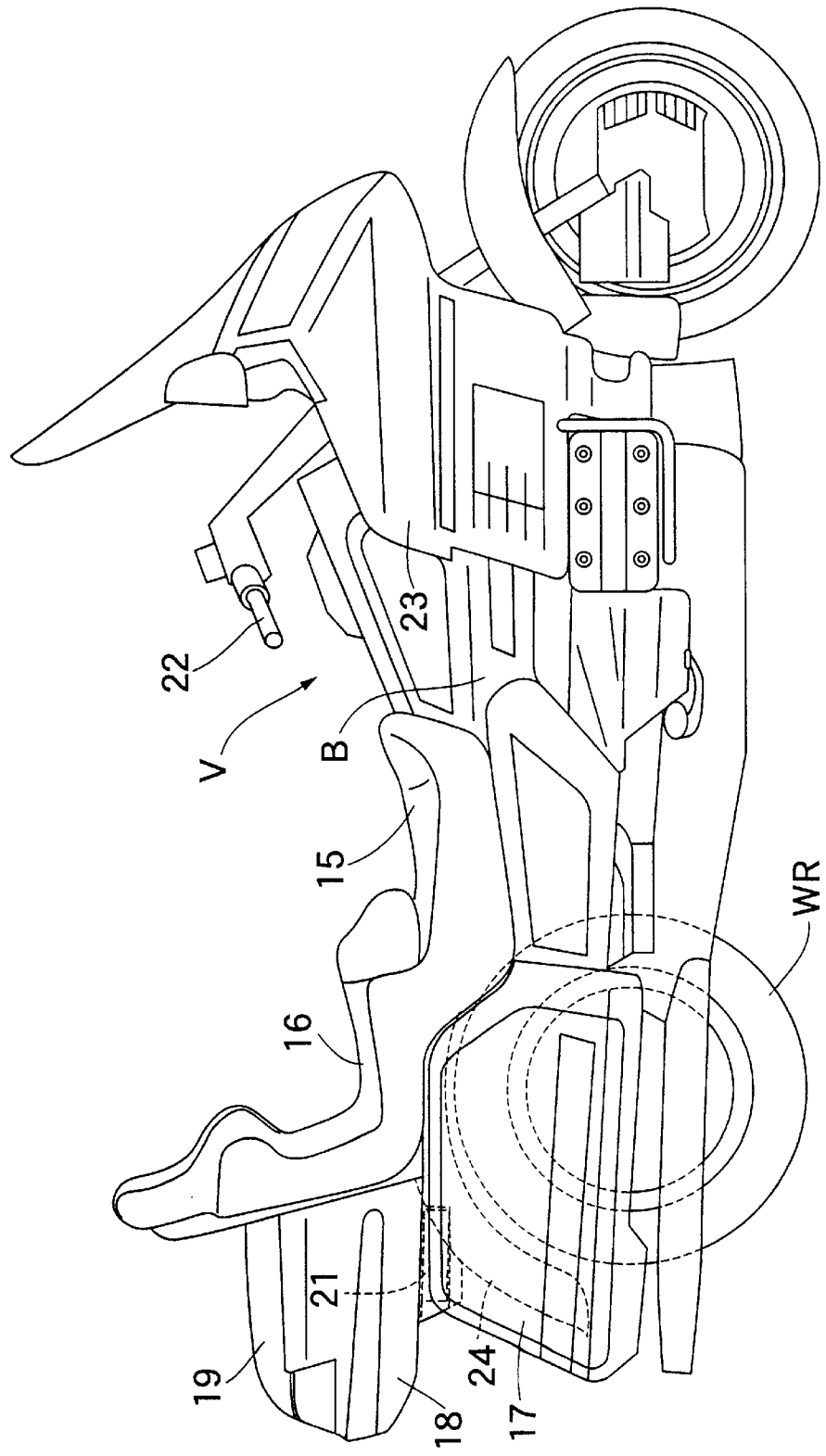
FIG. 1 is a side view of a motorcycle.
Figure 2:
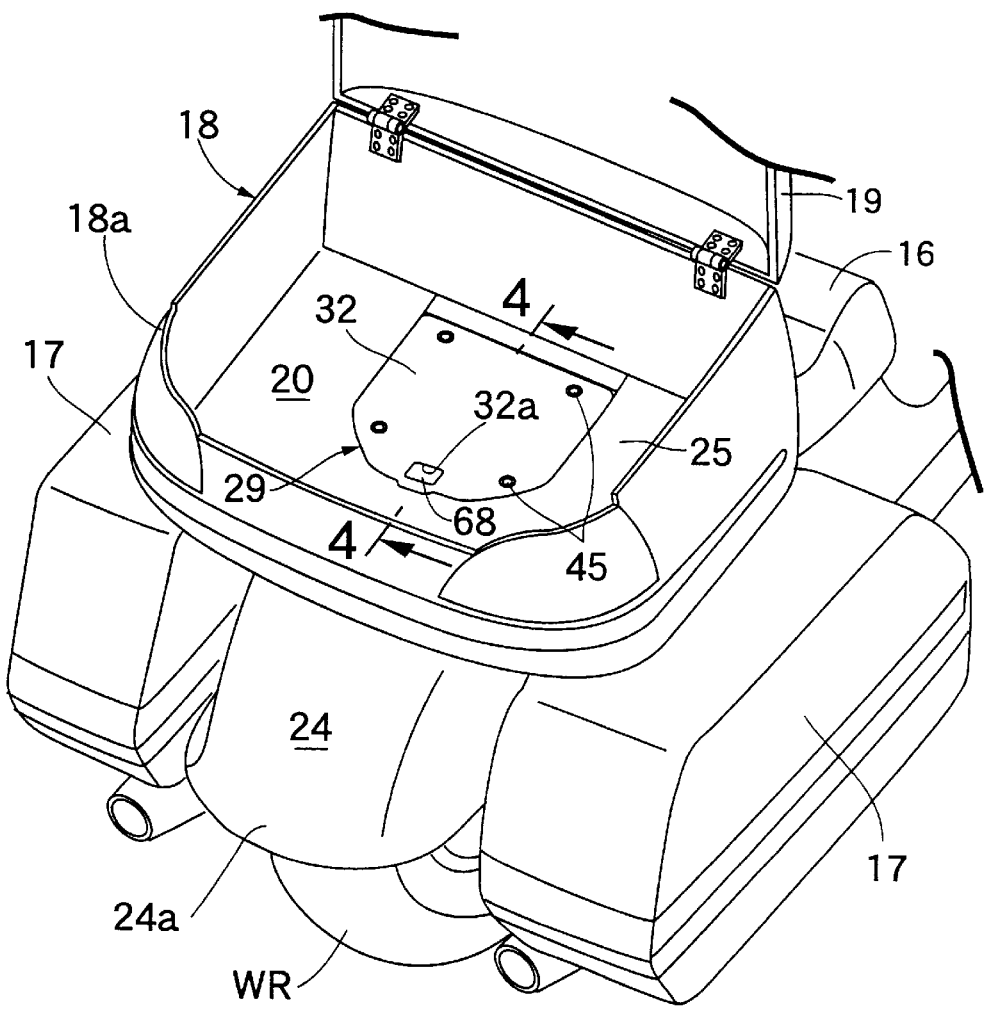
FIG. 2 is a perspective view of a trunk of the motorcycle in an open state.
Figure 3:
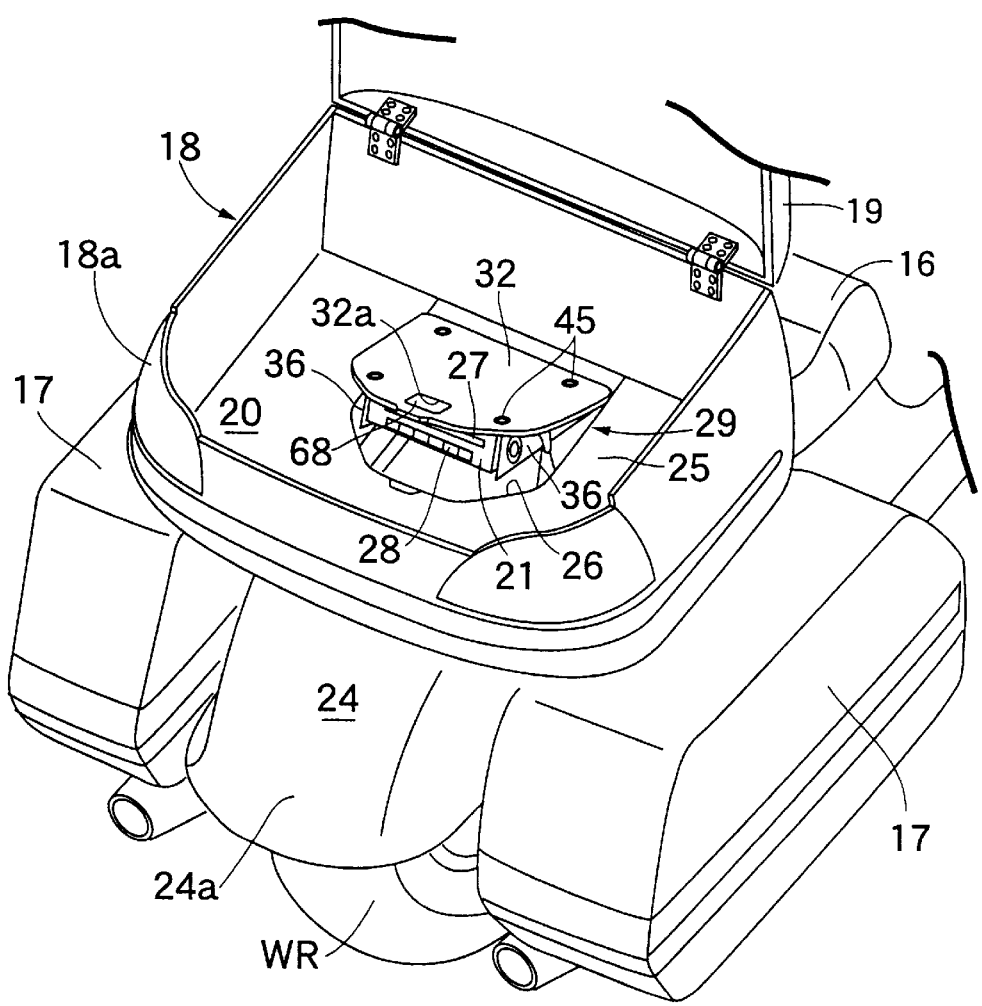
FIG. 3 is a perspective view of FIG. 2 in which a CD changer is in a protruding position.

A preferred embodiment of the present invention is explained by reference to FIGS. 1 to 12. In FIGS. 1 to 3, a vehicle body B of a large motorcycle V has a main seat 15, which is for an occupant to sit on and is positioned above a rear wheel WR of the motorcycle. A pillion seat 16 located behind the main seat 15 is for a pillion passenger to ride on. Side bags 17, which are positioned on each of right and left sides of the rear wheel WR. A trunk 18 is placed above the rear wheel WR and behind the pillion seat 16.

The trunk 18 is formed so the top thereof can be opened. A trunk lid 19 is connected by a hinge to the top of the trunk 18 so the top of the trunk 18 can be opened and closed by the trunk lid 19. The trunk 18 stores a CD changer 21. A driver sitting on the main seat 10 and gripping handlebars 22 listens to music by means of a loudspeaker (not illustrated) provided in a cowling 23, and the like or an intercom (not illustrated) provided in a helmet, and the like. The driver uses the CD changer 21 to select a piece of music and adjusts the volume and quality of the sound manually wherein the driver and a pillion passenger on the pillion seat 16 can also enjoy the music.

Figure 4:
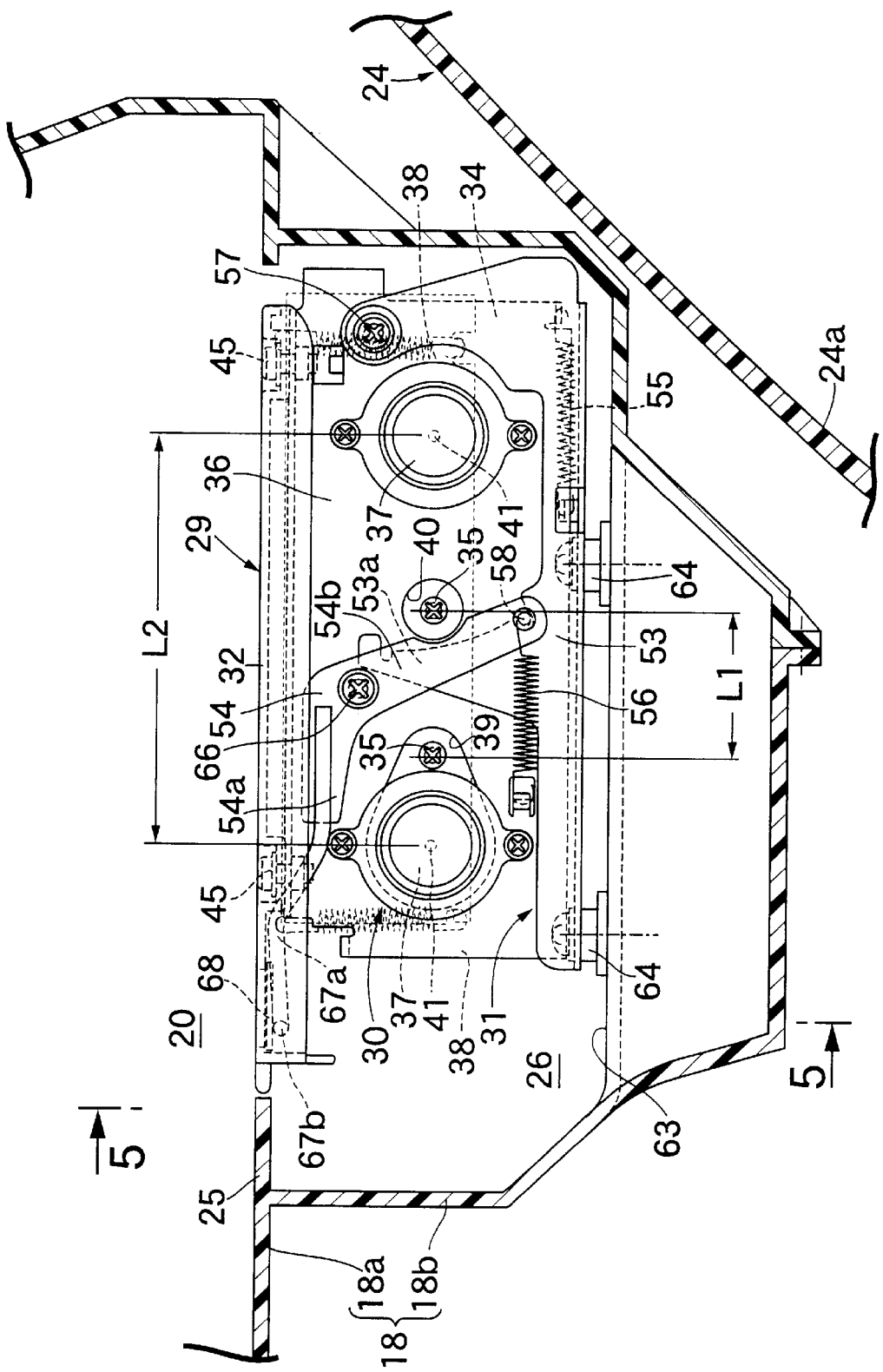
FIG. 4 is an enlarged cross sectional view of line 4—4 in FIG. 2.
Figure 5:
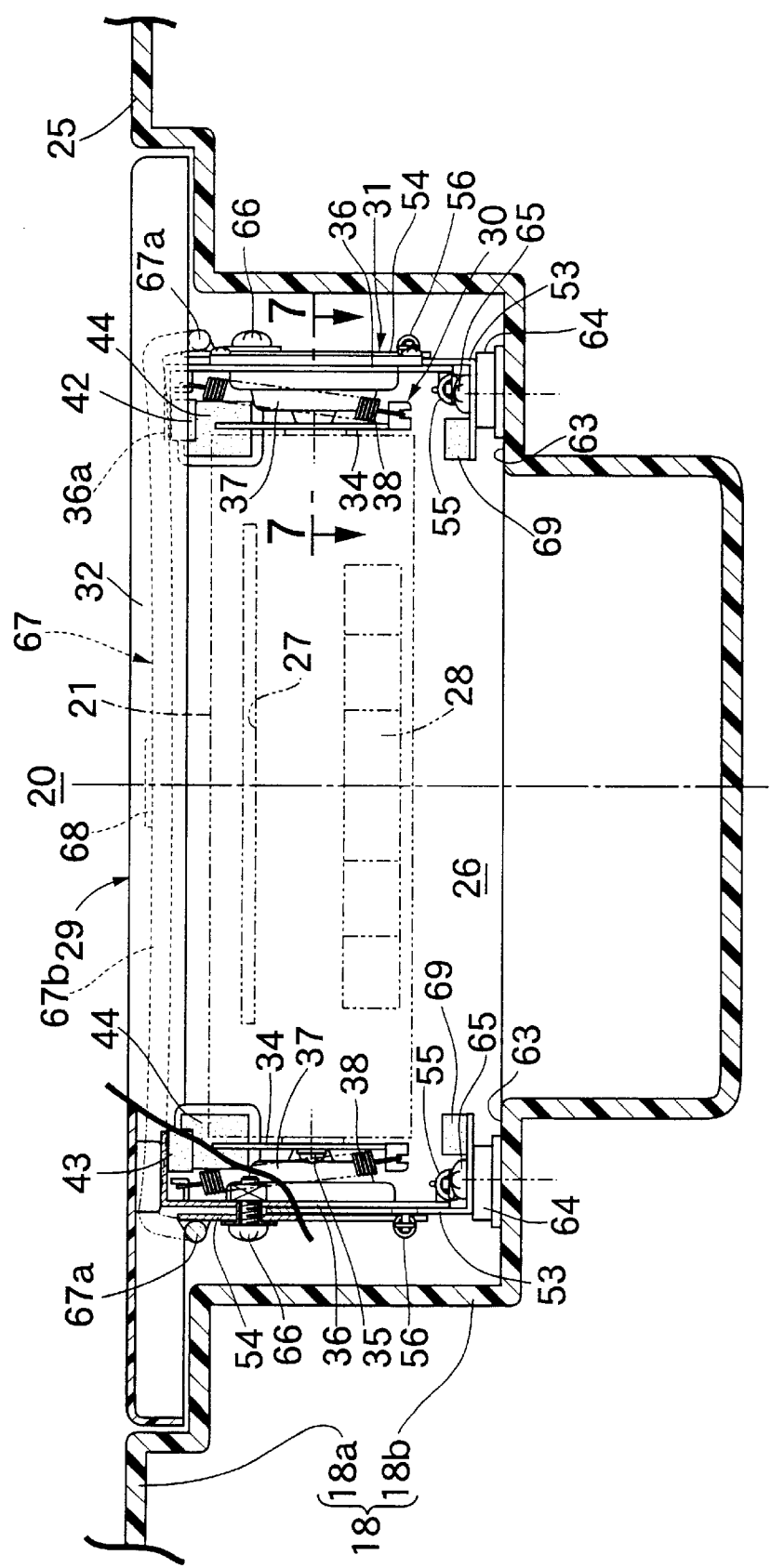
FIG. 5 is a cross sectional view of line 5—5 in FIG. 4.

Referring also to FIG. 4, the trunk 18 is placed above the rear fender 24 covering the upper part of the rear wheel WR. The trunk 18 includes a box-shaped trunk main part 18a having a horizontal base 25 and an open top. The trunk 18 also includes a protrusion 18b disposed between a rear downward curve 24a of the rear fender 24 and the trunk main part 18a so as to protrude downward from a lower front part of the trunk main part 18a. The trunk main part 18a forms a luggage compartment 20. A storage recess 26 opening onto the base 25, which is one of the walls forming the trunk main part 18a, is formed within the protrusion 18b.

The CD changer 21 is configured in the shape of an oblong box having major sides in the longitudinal direction of the motorcycle V and includes an opening 27 for inserting and removing a CD, as well as various switches 28 on the front surface of the CD changer 21. With the opening 27 and various switches 28 facing backward in the longitudinal direction of the motorcycle V, the CD changer 21, which is placed in a central area in the width direction of the motorcycle V, is stored in the storage recess 26.

Referring to FIGS. 5 to 8, the CD changer 21 is supported by a CD changer support device 29. This CD changer support device 29 comprises floating means 30 that floats the CD changer 21 to minimize the transmission of vibration from the vehicle body B to the CD changer 21. Swing support means 31 swing the CD changer 21 between a protruding position (FIG. 3) where the opening 27 and various switches 28 on the front surface of the CD changer 21 protrude into the luggage compartment 20 from the inner surface of the base 25 and a storage position (FIG. 2) where the CD changer 21 is stored within the storage recess 26. A cover plate 32 covers the CD changer 21 so that when the CD changer 21 is in the storage position, the cover plate 32 blocks the open end of the storage recess 26 and is on the same plane as the inner surface of the base 25.

On either side surface of the CD changer 21 are set two mounting points a distance L1 apart in the longitudinal direction. A pair of mounting plates 34 are mounted on the mounting points by means of, for example, screws 35. The inner surfaces of the mounting plates 34 face the two side surfaces of the CD changer 21.

The floating means 30 includes a pair of support plates 36 positioned to face the outer surfaces of the two mounting plates 34. Pairs of dampers 37 are attached to each of the two support plates 36 and support the two mounting plates 34. Two pairs of suspension springs 38 are provided between each of the two support plates 36 and the two mounting plates 34 bias the CD changer 21 upward.

The support plates 36 are supported via the swing support means 31 on the side of the trunk 18, that is, the vehicle body B. The support plates 36 have holes 39 and 40 to receive the mounting screws 35 from the outside of the support plate 36 to mount the mounting plates 34 on the side surfaces of the CD changer 21.

Two support points are set a distance L2 apart from each other on each of the two mounting plates 34 outside of the two mounting points along the longitudinal direction of the CD changer 21, wherein the distance L2 is larger than the distance L1. Shafts 41 fixed to the mounting plates 34 at respective support points are linked to the dampers 37, a pair of which are attached to each of the two support plates 36.

The dampers 37 are known in the art and are formed by, for example, enclosing a highly viscous liquid, such as grease, in a disc-shaped bag made of an elastic material, such as rubber. By linking the shafts 41 to central parts of the corresponding dampers 37, the relative movement between opposite surfaces of the mounting plates 34 and the opposing support plates 36 is absorbed by the dampers 37.

The suspension springs 38 are provided between each of the lower parts, at the two ends in the longitudinal direction, of the mounting plates 34 and the upper parts, at the two ends of the support plates 36. The suspension springs 38 suspend the weight of the CD changer 21 from the support plates 36.

Elastic members 42, 43, such as a sponge, are mounted on the support plates 36 to face the upper surface of the CD changer 21 at the two ends in the longitudinal direction of the CD changer 21. Another elastic member 44, such as a sponge, faces the rear end of the CD changer 21 to absorb a collision between the CD changer 21 and the support plates 36 due to the sudden application of a load.

The cover plate 32 covering the CD changer 21 is fixed to the two support plates 36 by means of, for example, a plurality of bolts 45 and weld nuts 46 fixed to the support plates 36 so as to correspond to the bolts 45. The two support plates 36 are linked and operated together via the cover plate 32.

When assembling the CD changer support device 29, if the cover plate 32 is removed from the two support plates 36, the position of the two support plates 36 relative to each other is not fixed and it is difficult to line up the positions when connecting the two mounting plates 34 and each of the dampers 37.

Figure 6:
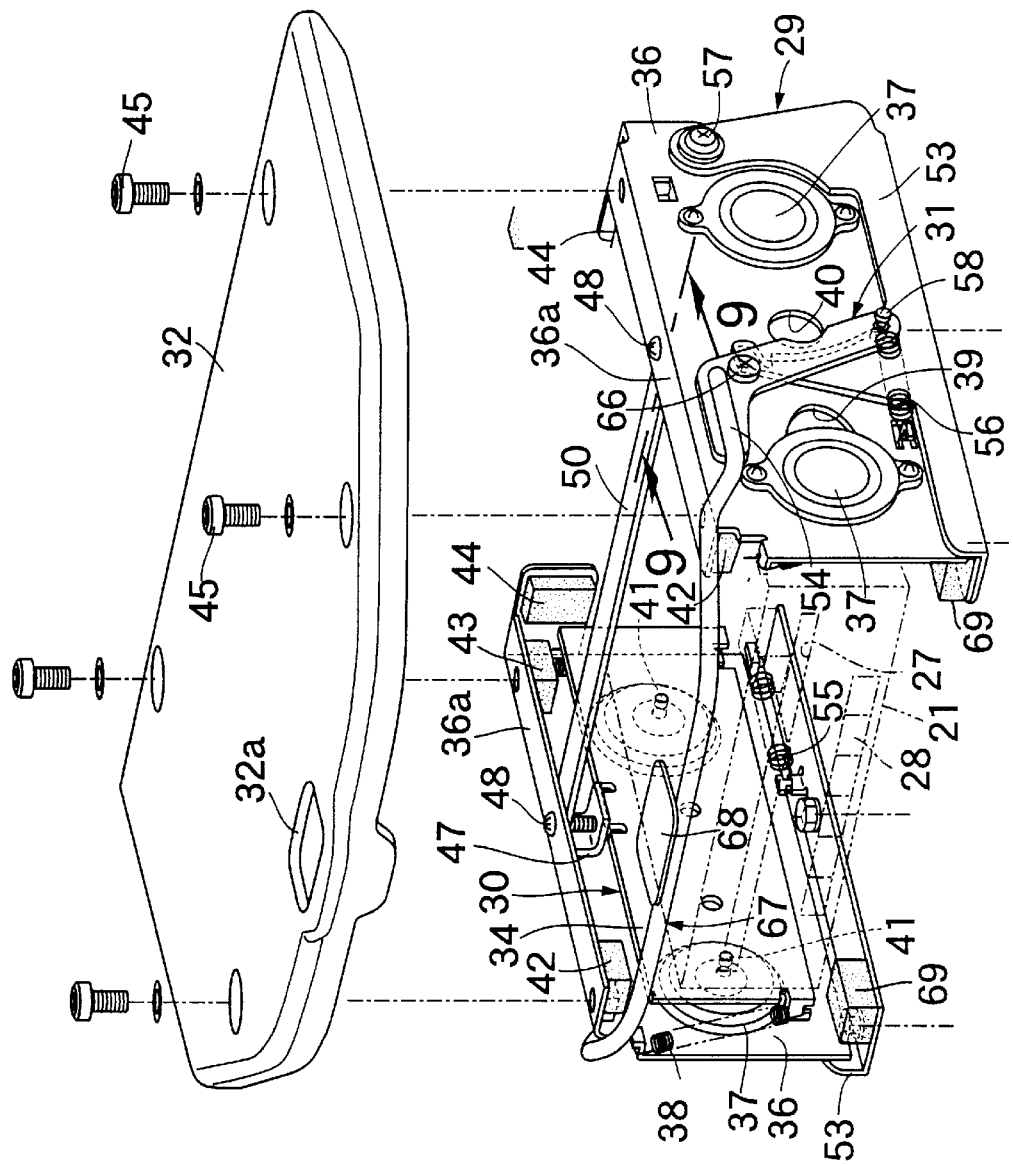
FIG. 6 is a perspective view of a CD changer support device with a cover plate thereof removed.
Figure 7:
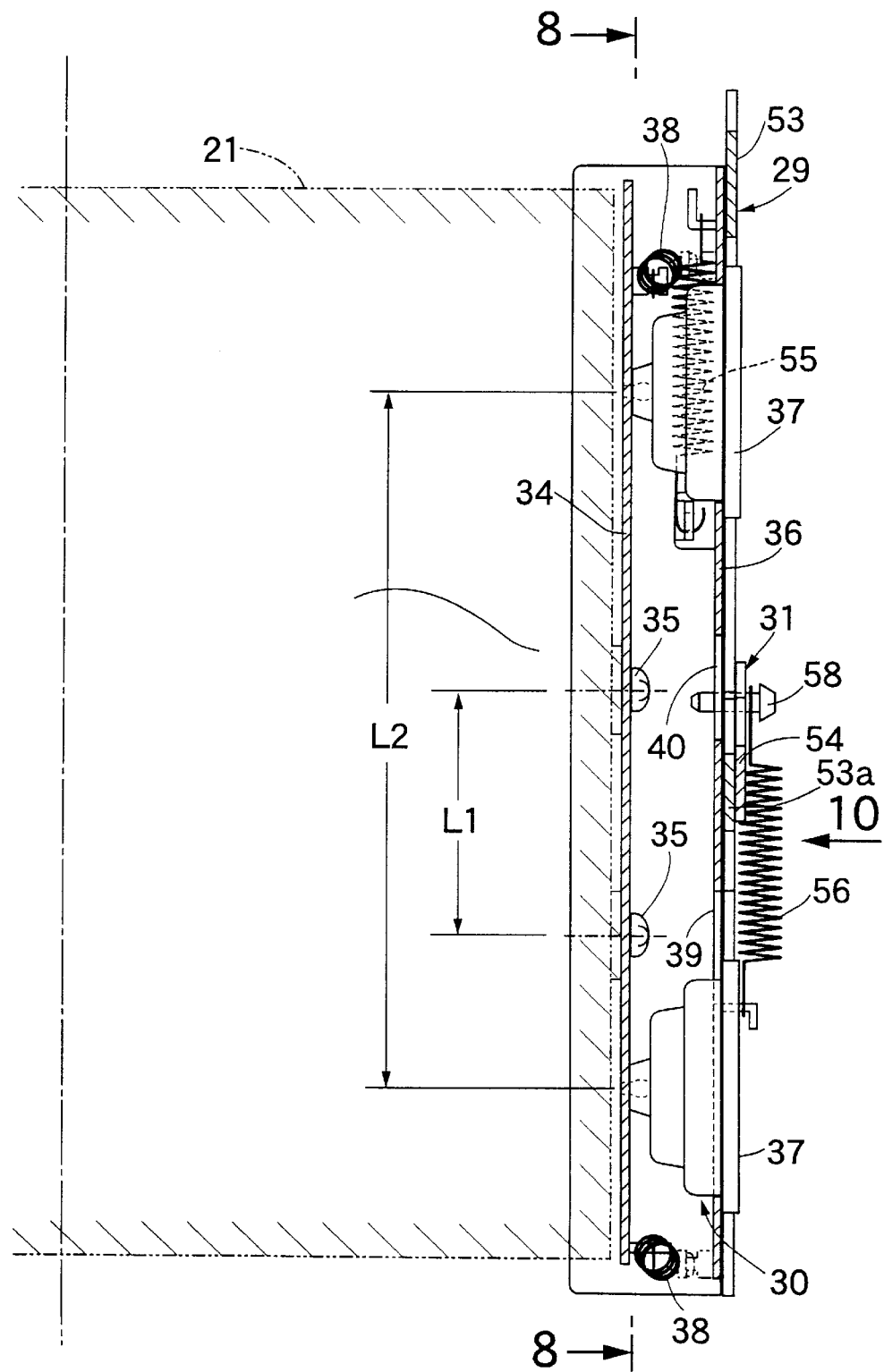
FIG. 7 is an enlarged cross sectional view of line 7—7 in FIG. 5.
Figure 8:
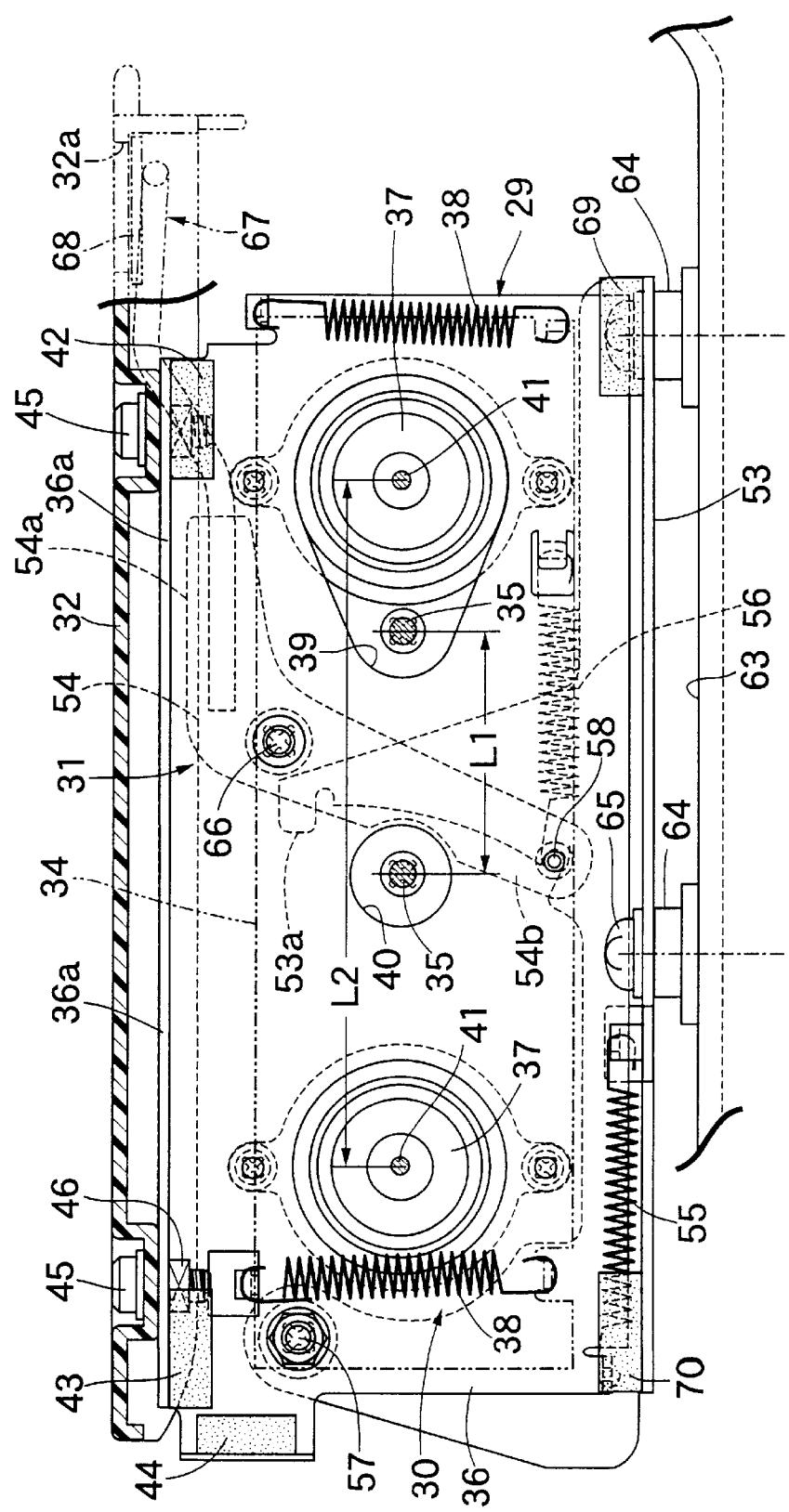
FIG. 8 is cross sectional view of line 8—8 in FIG. 7.

When the cover plate 32 is being removed, a pair of stoppers 47 are set between the two mounting plates 34 and the two support plates 36 in an independently detachable manner, as shown in FIG. 6.

Figure 9:
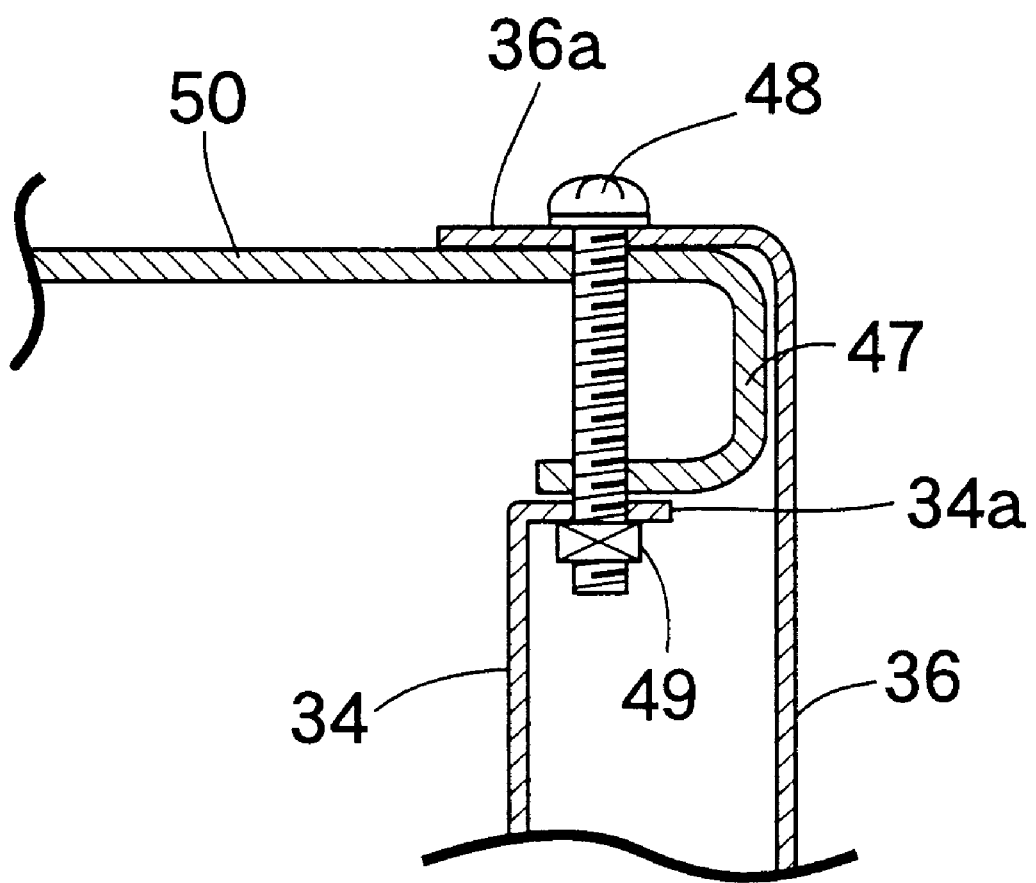
FIG. 9 is an enlarged cross sectional view of line 9—9 in FIG. 6.

As shown in FIG. 9, a flange 36*a* is integrally provided on the upper part of the support plate 36 so as to overhang inward. A flange 34*a* facing the support plate flange 36*a* is integrally provided on the upper part of the mounting plate 34. The stopper 47 is configured to have, for example, an approximately U shape and is inserted between the support plate and mounting plate flanges 36*a* and 34*a*, respectively. A screw 48 is inserted from the top through the support plate flange 36*a*, the stopper 47, and the mounting plate flange 34*a*. The screw 48 mates with a weld nut 49 fixed to the lower surface of the mounting plate flange 34*a*.

When the screws 48 are tightened, each stopper 47 is set between the two mounting plates 34 and the two support plates 36. Thus, the three dimensional position of the two mounting plates 34 relative to the two support plates 36 is maintained. Positioning is easy when connecting the two mounting plates 34 and each of the dampers 37. Setting each of the stoppers 47 when carrying the CD changer support device 29 fixes and maintains the position of the CD changer 21, thus preventing it from vibrating.

The two stoppers 47 are linked to each other by a linking part 50. Linking the two stoppers 47 in this manner forms a unit from the floating means 30, which includes the mounting plates 34, the support plates 36, the dampers 37, and the suspension springs 38. As a result, assembling the CD changer support device 29 is simple and easy.

The swing support means 31 includes a pair of base plates 53 fixed to the outer surface of the support plates 36 and support the support plates 36 in a swingable manner. A pair of levers 54 are supported on the support plates 36 in a swingable manner to engage the base plates 53. Swing biasing springs 55 are provided between each of the support plates 36 and the corresponding base plates 53. Lever biasing springs 56 are provided between each of the support plates 36 and the corresponding levers 54.

The two base plates 53 individually corresponding to the two support plates 36 are fixed to support steps 63 provided within the projection 18*b* of the trunk 18 by means of a plurality of, for example two, pairs of weld nuts 64 and screws 65. The rear parts of the two support plates 36 are supported on the two base plates 53 in a swingable manner by horizontal and coaxial support shafts 57. By so doing, the two support plates 36 are supported on the base plates 53 in a manner such that the CD changer 21 is swingable between the protruding position where the front surface of the CD changer 21 protrudes inside the luggage compartment 20 from the inner surface of the base 25 and the storage position where the CD changer 21 is stored within the storage recess 26.

Figure 10:
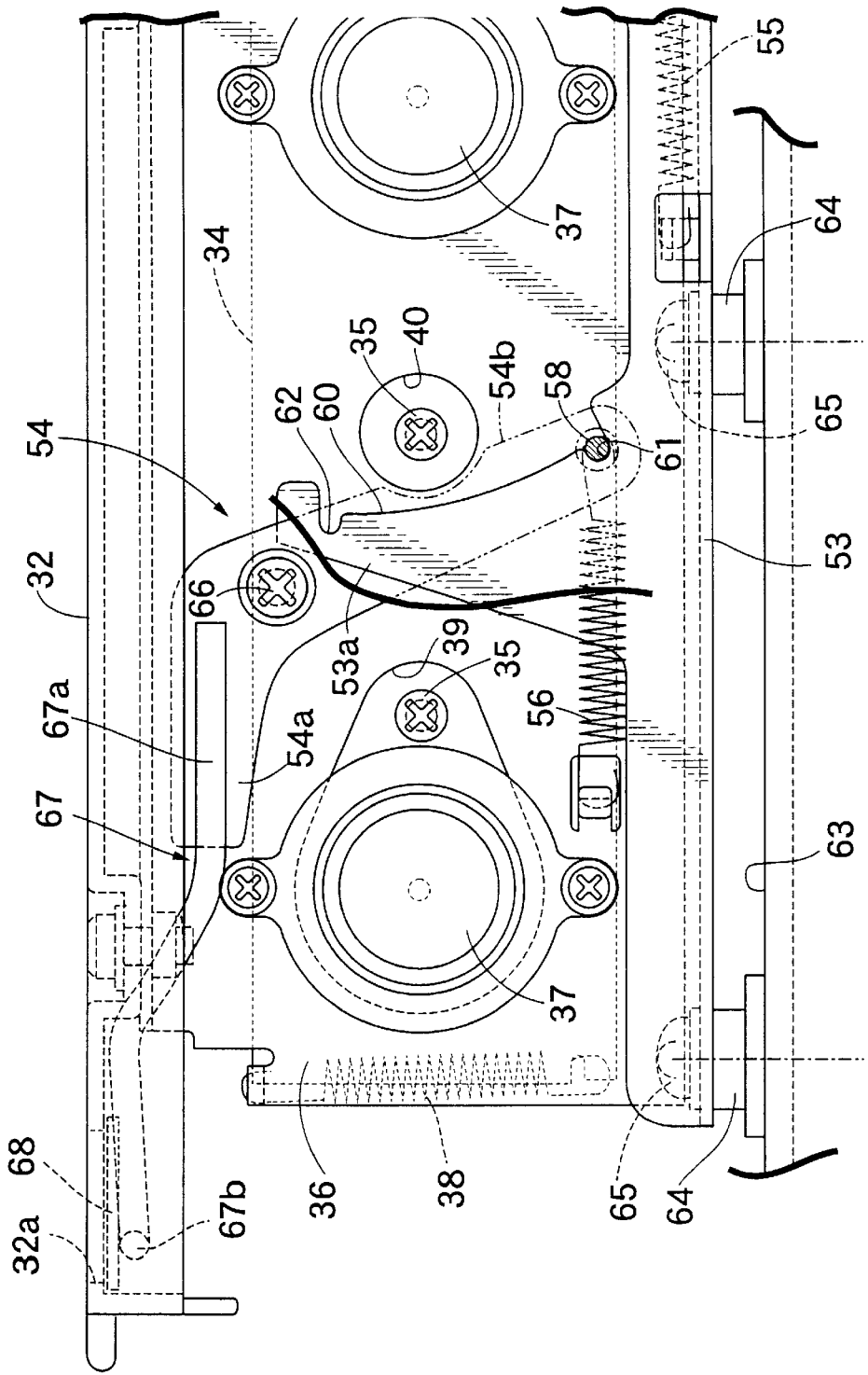
FIG. 10 is a view from arrow 10 in FIG. 7.

Referring further to FIG. 10, the lever 54 is made by integrally connecting an operating force application section 54*a*, which extends in the longitudinal direction of the CD changer 21, and a position restraining section 54*b*, which extends in the vertical direction of the CD changer 21, in an approximately L-shaped form. An intermediate part of the lever 54 connecting the operating force application section 54*a* and position restraining section 54*b* is supported in a swingable manner on the support plate 36 via a shaft 66 parallel to the support shaft 57. Moreover, a pin 58 is fixed to a lower extremity of the position restraining section 54*b*.

The levers 54 are linked to each other by a linking rod 67. The linking rod 67 is configured to have an approximately U-shaped form. The linking rod 67 includes a pair of lever forming parts 67*a*, that extends in the longitudinal direction of the CD changer 21 and are fixed to the levers 54 to form a part of the operating force application section 54*a*, and a linking part 67*b* that links the two lever forming parts 67*a* to each other in front of the two support plates 36. The linking rod 67 may contact the lower surface of the cover plate 32.

An operating part 68 made from a rectangular flat plate is fixed to a central part of the linking part 67*b*. The operating part 68 is positioned to face a rectangular window 32*a* provided in the front part of the cover plate 32. By pushing the operating part 68 downward, an operating force is transmitted to the two levers 54 via the linking rod 67 that pushes the operating force application sections 54*a* of the two levers 54 downward.

Guide plates 53*a* are integrally provided on each of the two base plates 53 on the forward side relative to the support shafts 57. Side edges of the guide plates 53*a* are provided with arc shaped guide recesses 60. The centers of the guide recesses are positioned on the axes of the support shafts 57 and make sliding contact with the pins 58. First engagement recesses 61 are formed on lower ends of and along the circumference of the guide recesses 60. Corresponding pins 58 engage the first engagement recesses 61 when the two support plates 36 are in the storage position. Second engagement recesses 62 are formed on ends of and along the circumferential direction of the guide recesses 60. Corresponding pins 58 engage the second engagement recesses 62 when the two support plates 36 are in the protruding position.

The lever biasing springs 56 are provided between the support plates 36 and the lower parts of the respective levers 54. Due to the spring forces of the lever biasing springs 56, the levers 54 are spring-biased in a direction in which the pins 58 make sliding contact with the guide recesses 60 and the engaged states of the pins 58 with the first engagement recesses 61 and the second engagement recesses 62 are maintained.

The swing biasing springs 55 are positioned inside the support plates 36 and between the rear parts of the support plates 36 and the base plates 53. Thus, the swing biasing springs 55 exhibit spring forces in a direction in which the support plates 36 are swung around the axes of the support shafts 57 toward the protruding position.

The base plates 53 include elastic members 69 and 70, such as, for example, sponges, that fuel the lower surface of the CD changer 21 at both ends in the longitudinal direction. The CD changer 21 is supported by the floating means 30 in order to absorb a collision between the CD changer 21 and the base plate 53 due to the sudden application of a load.

Figure 11:
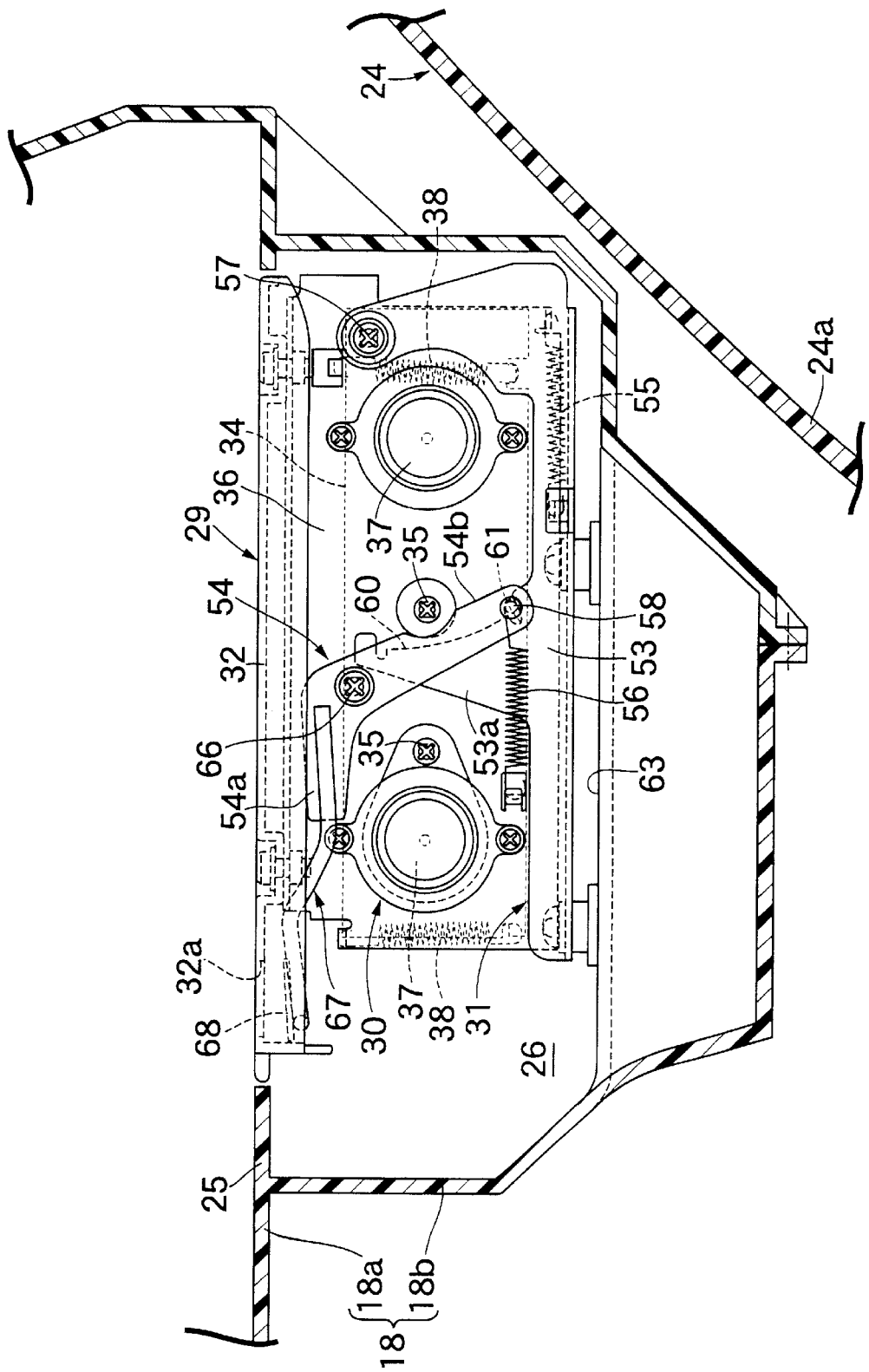
FIG. 11 is an enlarged cross sectional view of line 4—4 in FIG. 2 when operating a lever in a stored state.

In accordance with such swing support means 31, when pushing the operating part 68 in a state in which the two support plates 36 are in the storage position, as shown in FIG. 11, that is to say, the pins 58 are engaged with the first engagement recesses 61, the levers 54 swing so the pins 58 disengage from the first engagement recesses 61 against the spring forces of the lever biasing springs 56.

Figure 12:
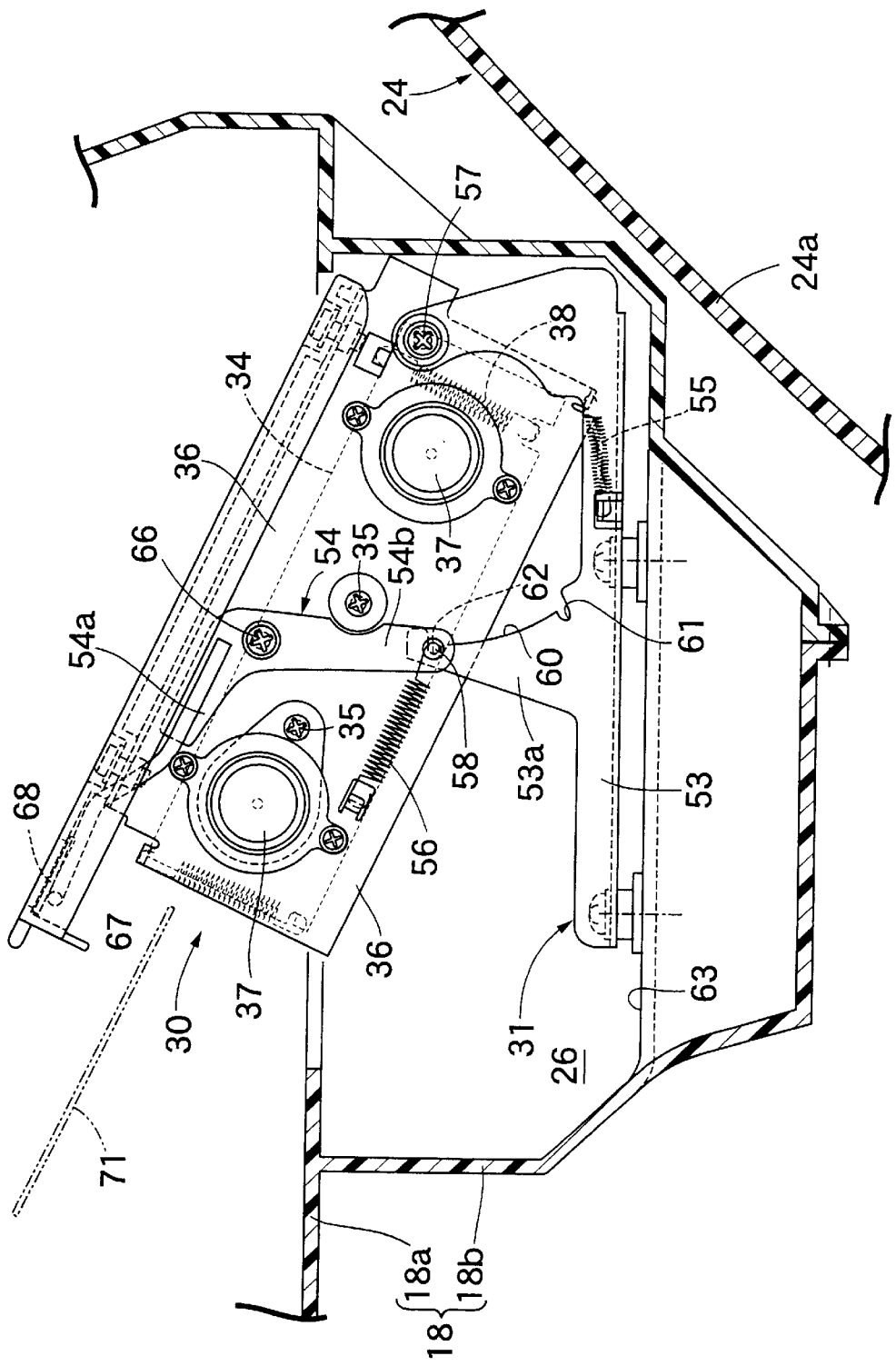
FIG. 12 is an enlarged cross sectional view of line 4—4 in FIG. 2 in a protrusion state.

When the engagement of the pins 58 with the first engagement recesses 61 is canceled, the forces that maintain the support plates 36 in the storage position against the spring forces of the swing biasing springs 55 are released. As shown in FIG. 12, the support plates 36 swing to the protruding position while keeping the pins 58 in sliding contact with the guide recesses 60. When the support plates 36 reach the protruding position, the pins 58 engage the second engagement recesses 62 due to the spring forces of the lever biasing springs 56 so as to maintain the support plates 36 in the protruding position.

In a state in which the support plates 36 are in the protruding position, when pushing the support plates 36 together with the cover plate 32, the lever 54 swings so the pins 58 disengage from the second engagement recesses 62 against the spring forces of the lever biasing springs 56. Further, pushing the support plates 36 together with the cover plate 32 swings the support plates 36 to the storage position against the spring forces of the swing biasing springs 55 while keeping the pins 58 in sliding contact with the guide recesses 60. As a result, upon removing pressure from the cover plate 32 in a state in which the pins 58 are engaged with the first engagement recesses 61 due to the spring forces of the lever biasing springs 56, the support plates 36 are maintained in the storage position.

The operation of this embodiment is explained below. The trunk 18 is placed above the rear fender 24 covering the upper part of the rear wheel WR of the motorcycle V. The trunk 18 is formed from the trunk main part 18a having the horizontal base 25 and the protrusion 18b placed between the rear downward curve 24a of the rear fender 24 and the trunk main part 18a so as to protrude downward from the lower front part of the trunk main part 18a. The storage recess 26 is formed within the protrusion 18b so as to open onto the base 25 of the trunk main part 18a. The CD changer 21 is placed in the central part in the width direction of the motorcycle V and stored in the storage recess 26.

In accordance with such a mounting structure for the CD changer 21 on the motorcycle V, since the CD changer 21 is placed in the central part in the width direction of the motorcycle V, it is possible to minimize the vibration acting on the CD changer 21 from the vehicle body B. Moreover, since the protrusion 18b for storing the CD changer 21 is provided using the space above the rear part of the rear fender 24 so as to protrude downward from the lower front part of the trunk main part 18a, the size of the trunk 18 is maintained while avoiding any adverse influence of the balance of the motorcycle V, and the CD changer 21 is effectively placed.

The CD changer 21 is supported by the CD changer support device 29. The CD changer support device 29 includes the floating means 30 having, on either side of the CD changer 21, the pair of support plates 36 floating the CD changer 21. Thus, the transmission of vibration from the vehicle body B to the CD changer 21 is minimized. Swing support means 31 support the support plates 36 in a swingable manner. The cover plate 32 covers the CD changer 21 and is fixed to the two support plates 36.

Moreover, the swing support means 31 is provided between the support plates 36 and the support steps 63 provided on the trunk 18 within the storage recess 26 so as to swing the CD changer 21 between the protruding position and the storage position. In the protruding position, the opening 27 and the various switches 28 on the front surface of the CD changer 21 protrude inside the luggage compartment 20 from the inner surface of the base 25. In the storage position, the CD changer 21 is stored within the storage recess 26.

Since the CD changer 21 swings between the storage position, where it is stored in the storage recess 26, and the protruding position, where the front surface protrudes inside the luggage compartment 20 from the inner surface of the base 25 so as to enable a compact disc (CD) 71 to be inserted and removed (FIG. 12), the CD changer 21 is stored in the storage recess 26 unless the CD 71 is being inserted or removed. It is also possible to prevent the effective capacity of the luggage compartment 20 of the trunk 18 from decreasing due to the placement of the CD changer 21, thus securing a sufficient effective capacity.

When the CD changer 21 is in the storage position, since the cover plate 32 blocks the open end of the storage recess 26 and is on the same plane as the inner surface of the base 25, the internal appearance of the luggage compartment 20 is not degraded. Moreover, it is possible to prevent any foreign matter from coming into contact with and damaging the CD changer 21. Furthermore, the cover plate 32 links the support plates 36 to each other to enhance the rigidity with which the CD changer 21 is supported by the support plates 36.

Moreover, pushing the cover plate 32 transmits the operating force to swing the CD changer 21 from the protruding position to the storage position to the swing support means 31, the operation of swinging the CD changer 21 from the protruding position to the storage position is simple and easy.

Furthermore, since the operating part 68 is positioned facing the window 32a in the cover plate 32, when the CD changer 21 is swung from the protruding position to the storage position, the cover plate 32 is operated directly. When the CD changer 21 is swung from the storage position to the protruding position, only the operating part 68 facing the window 32a of the cover plate 32 is operated. Thus, the swinging operation of the CD changer is easy.

With regard to the floating means 30 of the CD changer support device 29, the mounting plates 34 are supported on the pair of support plates 36 via the dampers 37 at two positions having a larger span than that of the two mounting points for mounting the two sides of the CD changer 21 on the mounting plates 34. The CD changer 21 is biased upward by the pairs of suspension springs 38 provided between each of the two ends of the two mounting plates 34 and the corresponding two support plates 36. The CD changer 21 is floated by the two support plates 36 with good balance. The vibration transmitted from the vehicle body B to the CD changer 21 via the two support plates 36 is absorbed by each of the dampers 37 and suspension springs 38 to avoid the occurrence of sound skipping.

Moreover, since the pair of stoppers 47 that maintain the relative three dimensional positions of the two mounting plates 34 and the two support plates 36 are set in a detachable manner between the two mounting plates 34 and the two support plates 36, setting the two stoppers 47 permits easy positioning when connecting the dampers 37 to the two mounting plates 34. Thus, the CD changer 21 is fixed thereto and its position maintained while being carried.

Furthermore, since the two stoppers 47 are linked to each other by the linking part 50, it is possible to form a unit from the CD changer 21 and the floating means 30, that includes the two mounting plates 34, the two support plates 36, the dampers 37, and the suspension springs 38 provided between the two mounting plates 34 and the two support plates 36. Thus, mounting the CD changer 21 on a vehicle and assembly of the CD changer support device 29 is easy.

With regard to the swing support means 31 of the CD changer support device 29, guide plates 53a are integrally provided on the pair of base plates 53 fixed to the trunk 18 and are positioned on the forward side relative to the support shafts 57 that support the support plates 36 in a swingable manner. The arc shaped guide recesses 60 are provided on the side edges of the guide plates 53a with their centers on the axes of the support shafts 57. The first engagement recesses 61 are formed on one end of the guide recesses 60 in the circumferential direction. Second engagement recesses 62 are formed on the other end of the guide recesses 60 in the circumferential direction.

The pins 58 that engage the first engagement recesses 61 when the support plates 36 are in the storage position and engage with the second engagement recesses 62 when the support plates 36 are in the protruding position are fixed to the levers 54 supported on the support plates 36 in a swingable manner by means of the shafts 66 parallel to the axes of the support shafts 57. The pins 58 are also in sliding contact with the guide recesses 60. The lever biasing springs 56 are positioned between the support plates 63 and each of the levers 54 and exhibit spring forces in a direction in which the pins 58 come into sliding contact with the corresponding guide recesses 60.

Furthermore, the swing biasing springs 55 are provided between the support plates 36 and the base plates 53 to force the support plates 36 toward the protruding position.

In the swing support means 31, the pair of support plates 36 and the CD changer 21 swing around the axes of the support shafts 57 within a range in which the pins 58 are in sliding contact with the guide recesses 60. Engagement of the pins 58 with the first engagement recesses 61 and the second engagement recesses 62 determines the storage position and the protruding position of the support plates 36, thereby changing the attitude of the CD changer 21 between the time when the CD 71 is inserted and removed and the time when the CD 71 is played.

Furthermore, the application of an operating force to the levers 54 disengages the pins 58 from the engagement recesses 61 and 62 against the spring forces of the lever biasing springs 56. When the pins 58 are disengaged from the first engagement recesses 61 in a state in which the support plates 36 are in the storage position, the support plates 36 automatically swing to the protruding position due to the spring forces of the swing biasing springs 55. When the pins 58 are disengaged from the second engagement recesses 62 in a state in which the support plates 36 are in the protruding position, pushing the support plates 36 against the spring forces of the swing biasing springs 55 swings the support plates 36 to the storage position.

The lever biasing springs 56 exhibit spring forces wherein the pins 58 are in sliding contact with the guide recesses 60 and maintain the engagement state of the pins 58 with the first engagement recesses 61 or the second engagement recesses 62 and also prevents the occurrence of any rattling between the support plates 36 and the base plates 53.

With regard to the lever 54, the operating force application section 54*a* and the position restraining section 54*b* are made in an approximately L-shaped form. Since the part that connects the operating force application section 54*a* and the position restraining section 54*b* is supported in a swingable manner on the support plate 36 and the pin 58 is fixed to the extremity of the position restraining section 54*b*, the operating force application section 54*a* that applies an operating force to disengage the pin 58 from the first and second engagement recesses 61 and 62 is made comparatively long, and the operating force required for moving the lever 54 can be made comparatively small.

While the invention has been described in conjunction with the preferred embodiment, it is evident that many alternatives, modifications, and variations may be apparent to those skilled in the art. Accordingly, the specific embodiment of the invention set forth herein is intended to be illustrative, not limiting. Various changes may be made without departing from the spirit and scope of the invention as set forth in the following claims.

What is claimed is:

1. A CD changer mounting structure mountable to a motorcycle having a rear fender covering an upper part of a rear wheel of the motorcycle, comprising:
   a trunk of the motorcycle disposed above the rear fender, the trunk including a trunk main part having a horizontal base and a protrusion disposed between a rear downward curve of the rear fender and the trunk main part, wherein the protrusion extends downward from a lower front part of the trunk main part and the trunk forms a luggage compartment; and
   a CD changer is stored within the protrusion in a central area of the motorcycle along a width of the motorcycle.

2. The CD changer mounting structure according to claim 1 wherein:
   a storage recess provided in the trunk, the storage recess being configured to store a CD changer having an opening on a front surface to insert and remove therefrom a compact disc;
   swing support means that allow the CD changer to be swung between a protruding position where the front surface of the CD changer protrudes into the luggage compartment from an inner surface of the trunk, and a storage position where the CD changer is stored within the storage recess, the swing support means being provided among a pair of support plates that support either side of the CD changer and the trunk; and
   a cover plate covering the CD changer, wherein when the CD changer is in the storage position, the cover plate blocks the opening of the storage recess so as to be flush with the inner surface of the trunk, the cover plate being connected to both of the support plates so that an operating force applied to the CD changer for swinging from the protruding position to the storage position can be applied to the swing support means.

3. The CD changer mounting structure according to claim 2, wherein an operating part that operates the swing support means is positioned to face a window provided in the cover plate.

4. The CD changer mounting structure according to claim 2 wherein the swing support means comprises:
   a pair of base plates fixed to the trunk, each base plate corresponding to a support plate;
   a pair of support shafts, each support shaft connecting a corresponding support plate to a rear part of a corresponding base plate;
   a pair of swing biasing springs, each swing biasing spring being provided between a corresponding support plate and a corresponding base plate, whereby the CD changer is spring-biased toward the protruding position;
   a pair of levers that are supported to swing around axes parallel to the support shafts, the pair of levers being connected to each other and operable in association with each other;
   a pair of pins having axes parallel to the support shafts, each pin being fixed to a corresponding lever; and
   a pair of lever biasing springs, each lever biasing spring being provided between a corresponding lever and support plate;
   wherein a side edge on the support shaft side of each guide plate provided on a corresponding base plate on a forward side relative to the support shaft includes:
      a guide recess having a shape of an arc whose center is an axis of the support shaft and making sliding contact with a corresponding pin;

a first engagement recess formed on one end along the circumference of the guide recess so that a corresponding pin engages the first engagement recess when both of the support plates are in the storage position; and a second engagement recess formed on the other end along the circumference of the guide recess so that a corresponding pin engages the second engagement recess when both of the support plates are in the protruding position, wherein each of the lever biasing springs is provided between a corresponding lever and support plate so as to exhibit spring forces in a direction in which both pins make sliding contact with both of the guide recesses.

5. The CD changer mounting structure according to claim 4, wherein each lever includes an operating force application section integrally connected to a position restraining section to form an approximately L-shape, wherein a section connecting the operating force application section and the position restraining section is supported on the support plate in a swingable manner, and the pin is fixed to an extremity of the position restraining section.

6. A CD changer support device mountable in a trunk that forms a luggage compartment of a motorcycle, comprising:

a storage recess configured to store a CD changer having an opening on a front surface to insert and remove compact discs therefrom, the storage recess being provided in a luggage compartment-forming wall of the trunk; and swing support means that allow the CD changer to be swung between a protruding position where the front surface of the CD changer protrudes inside the luggage compartment from an inner surface of the luggage compartment-forming wall and a storage position where the CD changer is stored within the storage recess, the swing support means being provided among the luggage compartment-forming wall and a pair of support plates that support either side of the CD changer; and a cover plate covering the CD changer, wherein when the CD changer is in the storage position, the cover plate blocks the opening of the storage recess so as to be flush with the inner surface of the luggage compartment-forming wall, the cover plate being connected to both of the support plates so that an operating force applied to the CD changer for swinging from the protruding position to the storage position can be applied to the swing support means.

7. The CD changer support device according to claim 6, wherein an operating part that operates the swing support means is positioned to face a window provided in the cover plate.

8. The CD changer support device according to claim 6, wherein the swing support means comprises:

a pair of base plates fixed to the luggage compartment-forming wall, each base plate corresponding to a support plates;

a pair of support shafts, each support shaft connecting a corresponding support plate to a rear part of a corresponding base plate;

a pair of swing biasing springs, each swing biasing spring being provided between a corresponding support plate and a corresponding base plate whereby the CD changer is spring-biased toward the protruding position;

a pair of levers that are supported to swing around axes parallel to the support shafts, the pair of levers being connected to each other and operable in association with each other;

a pair of pins having axes parallel to the support shafts, each pin being fixed to a corresponding lever; and a pair of lever biasing springs, each lever biasing spring being provided between a corresponding lever and support plate;

wherein a side edge on the support shaft side of each guide plate provided on a corresponding base plate on a forward side relative to the support shaft includes:

a guide recess having a shape of an arc whose center is an axis of the support shaft and making sliding contact with a corresponding pin;

a first engagement recess formed on one end along the circumference of the guide recess so that a corresponding pin engages the first engagement recess when both of the support plates are in the storage position; and a second engagement recess formed on the other end along the circumference of the guide recess so that a corresponding pin engages the second engagement recess when both of the support plates are in the protruding position, wherein each of the lever biasing springs is provided between a corresponding lever and support plate so as to exhibit spring forces in a direction in which both pins make sliding contact with both of the guide recesses.

9. The CD changer support device according to claim 8, wherein each lever includes an operating force application section integrally connected to a position restraining section to form an approximately L-shape, wherein a section connecting the operating force application section and the position restraining section is supported on the support plate in a swingable manner, and the pin is fixed to an extremity of the position restraining section.

10. A CD changer support device wherein:

a pair of mounting plates, each mounting plate being mounted on either side of a CD changer having an opening on a front surface to insert and remove a compact disc therefrom;

a pair of mounting points provided in either side of the CD changer and separated from each other along a longitudinal direction of the CD changer, each mounting plate being mounted to the CD changer at corresponding mounting points in such a manner that an inner surface of each mounting plate faces the side of the CD changer;

a pair of support plates supported on a vehicle body and facing outer surfaces of both of the two mounting plates;

at least two support points provided in each mounting plate and positioned outside the two mounting points provided along a longitudinal direction of the CD changer, wherein each support point is supported on a corresponding support plates via dampers; and a pair of springs positioned between each end of each mounting plate in the longitudinal direction and corresponding ends of each support plate to apply an upward force to the CD changer.

11. The CD changer support device according to claim 10, wherein a pair of stoppers are detachably set between both mounting plates and both support plates, wherein the stoppers can maintain a three dimensional position of the mounting plates and the support plates.

12. The CD changer support device according to claim 11, wherein the stoppers are linked to each other by a linking part.

13. The CD changer support device according to claim 10, further comprising:
- a storage recess configured to store a CD changer and provided in a luggage compartment-forming wall that forms a luggage compartment in the body of a vehicle;
- swing support means for allowing the CD changer to be swung between a protruding position where a front surface of the CD changer protrudes into the luggage compartment from an inner surface of the luggage compartment-forming wall, and a storage position where the CD changer is stored within the storage recess, the swing support means being provided among the pair of support plates that support either side of the CD changer and the luggage compartment-forming wall; and
- a cover plate covering the CD changer, wherein when the CD changer is in the storage position, the cover plate blocks the opening of the storage recess so as to be flush with the inner surface of the trunk, the cover plate being connected to both of the support plates so that an operating force applied to the CD changer for swinging from the protruding position to the storage position can be applied to the swing support means.

14. The CD changer support device according to claim 13, wherein an operating part that operates the swing support means is positioned to face a window provided in the cover plate.

15. The CD changer support device according to claim 13 wherein the swing support means comprises:
- a pair of base plates fixed to the luggage compartment-forming wall, each base plate corresponding to a support plates;
- a pair of support shafts, each support shaft connecting a corresponding support plate to a rear part of a corresponding base plate;
- a pair of swing biasing springs, each swing biasing spring being provided between a corresponding support plate and a corresponding base plate, whereby the CD changer is spring-biased toward the protruding position;
- a pair of levers that are supported to swing around axes parallel to the support shafts, the pair of levers being connected to each other and operable in association with each other;
- a pair of pins having axes parallel to the support shafts, each pin being fixed to a corresponding lever;
- a pair of lever biasing springs, each lever biasing spring being provided between a corresponding lever and support plate; and
- wherein a side edge on the support shaft side of each guide plate provided on a corresponding base plate on a forward side relative to the support shaft includes:
  - a guide recess having a shape of an arc whose center is an axis of the support shaft and making sliding contact with a corresponding pin;
  - a first engagement recess formed on one end along the circumference of the guide recess so that a corresponding pin engages the first engagement recess when both of the support plates are in the storage position; and
  - a second engagement recess formed on the other end along the circumference of the guide recess so that a corresponding pin engages the second engagement recess when both of the support plates are in the protruding position,
  - wherein each of the lever biasing springs is provided between a corresponding lever and support plate so as to exhibit spring forces in a direction in which both pins make sliding contact with both of the guide recesses.

16. The CD changer support device according to claim 15 wherein each lever includes an operating force application section integrally connected to a position restraining section to form an approximately L-shape, wherein a section connecting the operating force application section and the position restraining section is supported on the support plate in a swingable manner, and the pin is fixed to an extremity of the position restraining section.

* * * * *